United States Patent
Gupta et al.

(10) Patent No.: US 10,785,157 B2
(45) Date of Patent: Sep. 22, 2020

(54) ADAPTIVE LOAD-BALANCING OVER A MULTI-POINT LOGICAL INTERFACE

(71) Applicant: Juniper Networks, Inc., Sunnyvale, CA (US)

(72) Inventors: Sayantani Gupta, Bangalore (IN); Babu Singarayan, San Jose, CA (US); Vijeyalakshumi Koteeswaran, Mountain View, CA (US); Renuka Sri Harsha C H, Bangalore (IN); Arun G Menon, Bangalore (IN); Vishnu Janardhanan S, Bangalore (IN); Sukesh Kumar, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 72 days.

(21) Appl. No.: 15/919,662

(22) Filed: Mar. 13, 2018

(65) Prior Publication Data
US 2019/0288946 A1 Sep. 19, 2019

(51) Int. Cl.
*H04L 12/26* (2006.01)
*H04L 12/803* (2013.01)
(Continued)

(52) U.S. Cl.
CPC ........ *H04L 47/125* (2013.01); *H04L 41/0896* (2013.01); *H04L 43/0894* (2013.01);
(Continued)

(58) Field of Classification Search
CPC ... H04L 47/125; H04L 45/7453; H04L 49/25; H04L 41/0896; H04L 45/38
See application file for complete search history.

(56) References Cited

U.S. PATENT DOCUMENTS

| 8,953,599 B1 | 2/2015 | Barth et al. |
| 9,379,982 B1 | 6/2016 | Krishna et al. |

(Continued)

FOREIGN PATENT DOCUMENTS

WO 2010130545 A1 11/2010

OTHER PUBLICATIONS

Extended European Search Report dated Jun. 12, 2019 in counterpart European Application No. 18215646.3, 11 pp.
(Continued)

*Primary Examiner* — Abdelillah Elmejjarmi
(74) *Attorney, Agent, or Firm* — Shumaker & Sieffert, P.A.

(57) ABSTRACT

The techniques describe adaptive load-balancing based on traffic feedback from packet processors. In one example, a source virtual network node of the network device may determine whether a particular destination packet processor is or may become oversubscribed. For example, source packet processors of the source virtual network node may exchange feedback messages including traffic flow rate information. The source virtual network node may compute a total traffic flow rate and compare the total traffic flow rate with a bandwidth of the particular destination packet processor. In response to determining that the bandwidth of the destination packet processor is oversubscribed, the source virtual network node may update a forwarding plane data structure to reduce a likelihood of selecting the destination packet processor to which to forward packet flows.

18 Claims, 5 Drawing Sheets

(51) Int. Cl.
  *H04L 12/24* (2006.01)
  *H04L 12/721* (2013.01)
  *H04L 12/743* (2013.01)
  *H04L 12/947* (2013.01)
  *H04L 12/931* (2013.01)
  *H04L 12/825* (2013.01)
  *H04L 12/713* (2013.01)

(52) U.S. Cl.
  CPC ............ *H04L 45/38* (2013.01); *H04L 45/586* (2013.01); *H04L 45/7453* (2013.01); *H04L 47/263* (2013.01); *H04L 49/25* (2013.01); *H04L 49/50* (2013.01); *H04L 49/505* (2013.01); *H04L 43/16* (2013.01)

(56) References Cited

U.S. PATENT DOCUMENTS

| | | | | |
|---|---|---|---|---|
| 2003/0058793 | A1* | 3/2003 | Rochon | H04L 47/10 370/229 |
| 2013/0064068 | A1* | 3/2013 | Kamath | H04L 41/0668 370/222 |
| 2015/0146539 | A1* | 5/2015 | Mehta | H04L 45/22 370/237 |
| 2016/0087898 | A1* | 3/2016 | Ansari | H04L 12/18 370/235 |
| 2019/0028327 | A1* | 1/2019 | Silva | H04L 43/0811 |
| 2019/0222965 | A1* | 7/2019 | O'Connor | H04W 4/20 |

OTHER PUBLICATIONS

Response to Extended European Search Report dated Jun. 12, 2019 in counterpart European Application No. 18215646.3, filed Mar. 17, 2020, 15 pp.

Communication under 94(3) dated Jun. 3, 2020 received in counterpart European Application No. 18215646.3, 8 pp.

* cited by examiner

FIG. 4

FORWARDING PLANE DATA STRUCTURE 400

DISTRIBUTION 408

| | | | | | | | |
|---|---|---|---|---|---|---|---|
| PP 24E | PP 24F | PP 24G | PP 24H | PP 24E | PP 24F | PP 24G | PP 24H |
| PP 24E | PP 24F | PP 24G | PP 24H | PP 24E | PP 24F | PP 24G | PP 24H |
| PP 24E | PP 24F | PP 24G | PP 24H | PP 24E | PP 24F | PP 24G | PP 24H |
| PP 24E | PP 24F | PP 24G | PP 24H | PP 24E | PP 24F | PP 24G | PP 24H |
| PP 24E | PP 24F | PP 24G | PP 24H | PP 24E | PP 24F | PP 24G | PP 24H |
| PP 24E | PP 24F | PP 24G | PP 24H | PP 24E | PP 24F | PP 24G | PP 24H |
| PP 24E | PP 24F | PP 24G | PP 24H | PP 24E | PP 24F | PP 24G | PP 24H |
| PP 24E | PP 24F | PP 24G | PP 24H | PP 24E | PP 24F | PP 24G | PP 24H |

AF INDEX 402

LOCAL COUNT 404

NON-LOCAL COUNT 406

FORWARDING PLANE STRUCTURE 400'

DISTRIBUTION 408'

| | | | | | | | |
|---|---|---|---|---|---|---|---|
| PP 24E | PP 24F | PP 24G | PP 24H | PP 24F | PP 24G | PP 24H | PP 24F |
| PP 24H | PP 24G | PP 24H | PP 24F | PP 24E | PP 24F | PP 24E | PP 24H |
| PP 24G | PP 24F | PP 24G | PP 24H | PP 24H | PP 24F | PP 24G | PP 24E |
| PP 24E | PP 24F | PP 24G | PP 24H | PP 24F | PP 24G | PP 24H | PP 24F |
| PP 24H | PP 24G | PP 24E | PP 24F | PP 24E | PP 24F | PP 24G | PP 24H |
| PP 24G | PP 24F | PP 24G | PP 24E | PP 24H | PP 24F | PP 24G | PP 24E |
| PP 24H | PP 24E | PP 24H | PP 24F | PP 24E | PP 24F | PP 24G | PP 24H |
| PP 24G | PP 24H | PP 24G | PP 24E | PP 24H | PP 24F | PP 24G | PP 24E |

AF INDEX 402

LOCAL COUNT 404

NON-LOCAL COUNT 406

ADAPTIVE LOAD-BALANCING OVER A MULTI-POINT LOGICAL INTERFACE

TECHNICAL FIELD

The disclosure relates to computer networks and, more specifically, to forwarding packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

Routers may include one or more packet processors interconnected by an internal switch fabric. Packet processors receive and send data with other external devices via interface cards. The switch fabric provides an internal interconnect mechanism for forwarding data within the router between the packet processors for ultimate transmission over a network. In some examples, a router or switching device may employ a distributed, multi-stage switch fabric architecture, in which network packets traverse multiple stages of the switch fabric located in distributed packet processors of the router to travel from an ingress point of the switch fabric to an egress point of the switch fabric.

SUMMARY

In general, this disclosure describes techniques for adaptive load-balancing based on traffic feedback from packet processors. In some examples, a network device such as a router may be virtualized into multiple virtual network nodes by apportioning hardware resources of the router, such as packet processors, among the multiple virtual network nodes. One or more logical links may be provisioned between two virtual network nodes. For example, an abstract fabric interface (AF) link is a logical link construct that provides connectivity between virtual network nodes, using underlying physical fabric links of a switch fabric between packet processors. Source packet processors may forward incoming data across the internal switch fabric via the AF link towards a destination packet processor for ultimate transmission over a network.

In some examples, a source virtual network node of the network device may determine whether a destination packet processor of a destination virtual network node is or may become oversubscribed. For example, packet processors of the source virtual network node may exchange notifications, such as feedback messages, including traffic flow rate information. The source virtual network node may determine a total traffic flow rate, e.g., based in part on the feedback/notification messages, and compare the total traffic flow rate with a traffic flow rate threshold for the destination packet processor, e.g., based on a bandwidth capacity of the destination packet processor. In response to determining from this comparison that the bandwidth of the destination packet processor is oversubscribed or is likely to become oversubscribed, the source virtual network node may update its forwarding plane data structures so as to reduce a likelihood of selecting the destination packet processor for forwarding packets. For example, the source virtual network node may reprogram a hash lookup data structure such that the destination packet processor is less likely to be selected as the destination for a given packet flow received by the source virtual network node.

In this way, the network device can automatically adjust load-balancing to an oversubscribed destination packet processor (including before the destination packet processor becomes oversubscribed, based on a conservative threshold), thereby reducing oversubscription to destination packet processors, especially in load-balancing situations where multiple source packet processors forward packets to the same destination packet processor.

In one example, a method includes determining, by a source virtual network node of a network device including the source virtual network node having a plurality of source packet processors, a destination virtual network node having a plurality of destination packet processors, and a switch fabric comprising a plurality of fabric links coupling respective pairs of the plurality of source packet processors and the plurality of destination packet processors at respective fabric interfaces of the plurality of source packet processors and the plurality of destination packet processors, that a particular destination packet processor of the plurality of destination packet processors may become oversubscribed. The method may also include, in response to determining that the particular destination packet processor may become oversubscribed, updating, by the source virtual network node, a forwarding plane data structure of a source packet processor of the plurality of source packet processors to reduce a likelihood of selecting the particular destination packet processor to which to forward packet flows. The method may further include load-balancing, by the source virtual network node, received packet flows in accordance with the updated forwarding plane data structure.

In another example, a network device includes a source virtual network node having a plurality of source packet processors; a destination virtual network node having a plurality of destination packet processors; a plurality of fabric links coupling respective pairs of the plurality of source packet processors and the plurality of destination packet processors at respective fabric interfaces of the plurality of source packet processors and the plurality of destination packet processors, wherein the source virtual network node is configured to: determine that a particular destination packet processor of the plurality of destination packet processors may become oversubscribed; in response to determining that the particular destination packet processor may become oversubscribed, update a forwarding plane data structure of a source packet processor of the plurality of source packet processors to reduce a likelihood of selecting the particular destination packet processor to which to forward packet flows; and load-balance received packet flows in accordance with the updated forwarding plane data structure.

In another example, a non-transitory computer-readable storage medium of a network device including a source virtual network node having a plurality of source packet processors, a destination virtual network node having a plurality of destination packet processors, and a switch fabric comprising a plurality of fabric links coupling respective pairs of the plurality of source packet processors and the plurality of destination packet processors at respective fabric interfaces of the plurality of source packet processors and the plurality of destination packet processors, the non-transitory computer-readable storage medium storing instructions that when executed cause one or more programmable processors of a network device to: determine that a particular destination packet processor of a plurality of destination packet processors may become oversubscribed; in response to determining that the particular destination packet processor may become oversubscribed, update a forwarding plane data structure of a source packet processor of the plurality of source packet processors to reduce a likelihood of selecting the particular destination packet processor to which to forward packet flows; and load-balance received packet flows in accordance with the updated forwarding plane data structure.

The details of one or more examples of the techniques described herein are set forth in the accompanying drawings and the description below. Other features, objects, and advantages of the techniques described herein will be apparent from the description and drawings, and from the claims.

BRIEF DESCRIPTION OF DRAWINGS

FIG. 4 is a block diagram illustrating an example forwarding plane data structure and updated forwarding plane data structure, in accordance with techniques described in this disclosure.

DETAILED DESCRIPTION

Figure 1:
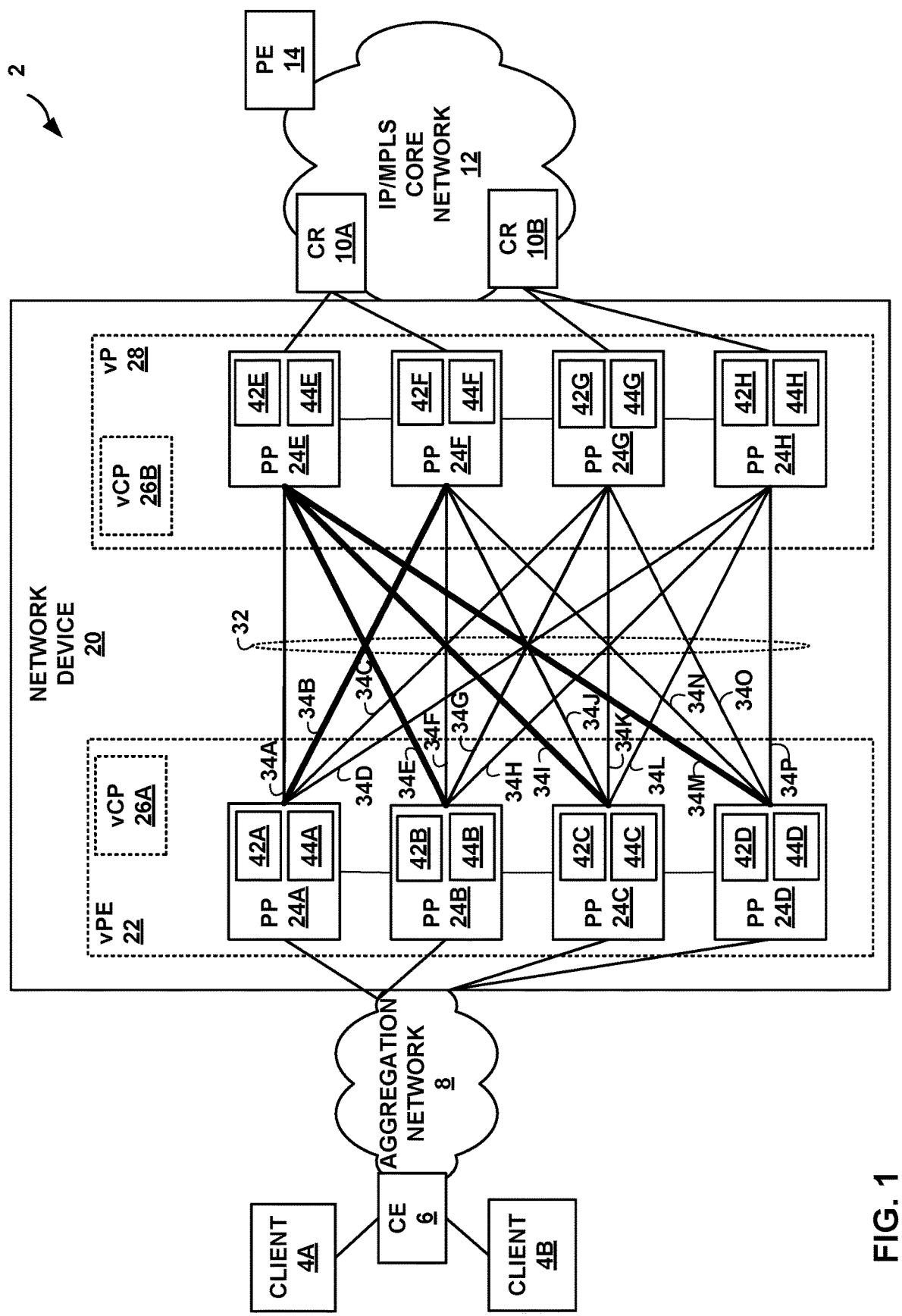
FIG. 1 is a block diagram illustrating an example network environment that includes a logical view of a network device configured in accordance with techniques described in this disclosure.

FIG. 1 is a block diagram illustrating an example network environment 2 that includes a logical view of a network device 20 configured in accordance with techniques described in this disclosure. For purposes of example, the techniques of this disclosure are described with respect to a simplified network environment 2 of FIG. 1 in which network device 20 communicates with core routers (CR) 10A-10B ("core routers 10") to provide client devices 4A-4B ("client devices 4") with access to services provided by devices in Internet Protocol (IP)/Multi-Protocol Label Switching (MPLS) core network 12.

The configuration of network environment 2 illustrated in FIG. 1 is merely an example. Although not illustrated as such, IP/MPLS core network 12 may be coupled to one or more networks administered by other providers, and may thus form part of a large-scale public network infrastructure, e.g., the Internet. Aggregation network 8 may be viewed as an access network to the Internet. A service provider network may provide computing devices coupled to client devices 4 with access to the Internet, and may allow the computing devices within customer networks (not shown) to communicate with each other. In another example, IP/MPLS core network 12 may provide network services within the core of the Internet. In either case, IP/MPLS core network 12 may include a variety of network devices (not shown) other than network device 20, provider edge (PE) router 14, and core routers 10, such as additional routers, switches, servers, or other devices.

Client devices 4 may be devices associated with one or more customer networks (not shown) coupled to customer edge (CE) router 6. In some examples, client devices 4 may include computing devices, such as personal computers, laptop computers, handheld computers, workstations, servers, switches, printers, customer data centers or other devices, for example. In other examples, client devices 4 may be endpoint devices such as a switch, a router, a gateway, or another terminal that operates as a demarcation point between customer equipment, such as subscriber devices, and service provider equipment. In one example, client devices 4 may comprise a digital subscriber line access multiplexer (DSLAM) or other switching device. For example, client devices 4 may be connected to one or more wireless radios or base stations (not shown) to wirelessly exchange packetized data with subscriber devices. Client devices 4 may comprise a switch, a router, a gateway, or another terminal that aggregates the packetized data received from the wireless radios to CE router 6. In some examples, aggregation network 8 may include an optical access network. For example, CE router 6 may comprise an optical line terminal (OLT) connected to one or more client devices 4 or optical network units (ONUs) via optical fiber cables.

Client devices 4 may be access nodes coupled to customer networks and subscriber devices. Client devices 4 are clients of services provided by PE router 14. In this example, a service provider network includes client devices 4 and customer edge (CE) router 6 that provide subscriber devices with access to aggregation network 8. In some examples, CE router 6 may comprise a router that maintains routing information between subscriber devices and aggregation network 8. CE router 6, for example, may include Broadband Remote Access Server (BRAS) functionality to aggregate output from one or more client devices 4 into a higher-speed uplink to aggregation network 8.

Network device 20 includes multiple routing components (e.g., routing processes) and packet processors of a forwarding component (otherwise referred to herein as "packet forwarding engines (PFEs)") that are physically coupled and configured to operate as separate logical routers. Network device 20 includes a virtual provider edge (vPE) node 22 ("vPE 22") and virtual core router (vP) node 28 ("vP 28"), which are cooperative virtual routing components operating as multiple distinct nodes from the perspective of network devices external to network device 20. Network device 20 may be a single-chassis router having a single physical chassis, which is virtualized into multiple virtual network nodes (referred to as "vNodes") by apportioning hardware resources of the router, such as packet processors 24A-24H (collectively, "PPs 24"), among the respective virtual network nodes. In the example of FIG. 1, vPE 22 may include PPs 24A-24D and vP 28 may include PPs 24E-24H. Individual PPs 24 are assigned to a particular vNode and are not shared among multiple vNodes.

To core routers 10 and CE router 6 of network environment 2, network device 20 appears as multiple routing devices, specifically, virtual PE (vPE) router 22 and virtual provider (vP) router 28. For example, although network device 20 includes a single chassis, from the perspective of core routers 10, network device 20 has multiple externally-advertised network addresses and maintains multiple peer routing sessions for each routing protocol maintaining peer routing sessions with each of the core routers 10.

Each of control planes (vCP) 26A-26B ("vCPs 26") of the vNodes instantiates with virtual machine (VM) technology. The vCP 26 either could be within the control unit (e.g., routing component) of network device 20 or outside the routing component. Each vNode could serve the role of different network functions, such as Internet service provider edge (PE), Virtual Private Network (VPN) service PE and Multiprotocol Label Switching (MPLS) Label Switching Router (LSR). Apart from these vNodes, in some examples network device 20 may also include an administrative VM instantiated for shared resources management (e.g., a management plane, not shown in FIG. 1).

Between two vNodes in network device 20, one logical layer-3 link is provisioned that is visible to devices external to network device 20. For example, in FIG. 1, abstract fabric interface (AF) link 32 ("AF link 32") provides a logical link between vPE 22 and vP 28. AF link 32 is layer-3 logical link construct and provides vNode to vNode connectivity. AF link 32 bundles fabric interconnects that connect the same vNodes. AF provides a single logical link connectivity between the vNodes, and could have many layer-1, layer-2, or layer-3 fabric bundling within, depending on implementation.

AF link 32 includes fabric interconnects 34A-34P (collectively, "fabric interconnects 34"). Fabric interconnects 34 terminate at fabric interfaces of one of PPs 24. In the example of FIG. 1, PP 24A may include fabric interconnects 34A-34D that terminate at PPs 24E-24H, respectively. PP 24B may include fabric interconnects 34E-34H that terminate at PPs 24E-24H, respectively. PP 24C may include fabric interconnects 34I-34L that terminate at PPs 24E-24H, respectively. PP 24A may include fabric interconnects 34M-34P that terminate at PPs 24E-24H, respectively. The fabric interconnects 34 may, in some examples, have identifiers, which are not generally advertised to devices external to network device 20. The fabric interconnects 34 are modelled as point-to-point Ethernet links between a pair of PPs 24.

In one example, assume that vPE 22 connects to vP 28 with equal cost abstract fabric paths via PP 24E-24H. When a packet arrives at vPE 22 from aggregation network 8 and destined for PE 14, vPE 22 typically sends data traffic to any of PPs 24E-24H based on load-balancing. To load-balance the data traffic among PPs 24E-24H, vPE 22 may perform a hashing algorithm on information from the received packet, e.g., a based on a 5-tuple of the packet (e.g., source IP address, destination IP address, source port, destination port, and protocol) to select one of the fabric interconnects 34 of AF link 32 that is used as an outgoing interface.

For example, PPs 24A-24H may include forwarding plane data structures 42A-42H (collectively, "forwarding plane data structures 42"), respectively, comprising entries representing a distribution of destination packet processors for which to forward traffic. In some examples, forwarding plane data structures 42 may include hash lookup data structures/selector table(s) storing data indicating a load-balanced distribution of destination packet processors for which to forward traffic. In the example of FIG. 1, forwarding plane data structure 42A may include a distribution of entries representing destination PPs 24E-24H. Source PP 24A select a destination packet processor (e.g., PPs 24E-24H) from forwarding plane data structure 42A (e.g., perform a hash algorithm on a received packet to compute a hash value), and forward the packet to the selected destination packet processor.

In some examples, the number of entries associated with a destination packet processor is determined based on the bandwidth of the destination packet processor. That is, the higher the bandwidth of a destination packet processor, the more entries the destination packet processor will have in forwarding plane data structures 42. For ease of illustration, assume the bandwidth of destination PPs 24E-24H each have a bandwidth of 100 Gbits/sec. As such, each of forwarding plane data structures 42A-42D has an equal distribution of entries for destination PPs 24E-24H. Although destination PPs 24E-24H each has the same bandwidth, each of destination PPs 24E-24H may have a higher or lower bandwidth, which results in more or fewer entries, respectively, in forwarding plane data structures 42.

In some examples, each of source PPs 24A-24D may receive traffic from Aggregation Network 8 and load-balance the traffic to the same destination packet processor, e.g., PP 24E. For example, each of source PPs 24A-24D may select PP 24E for which to forward traffic. This may occur when all the flows hash to the same destination packet processor, e.g., because only the destination IP address in a set of packet flows varies. However, when the total rate of traffic forwarded from source PPs 24A-24D exceeds the bandwidth of destination PP 24E, packets are dropped. For example, assume that PP 24A forwards traffic to PP 24E at a rate of 90 gigabits per second (Gbits/sec), PP 24B forwards traffic to PP 24E at a rate of 10 Gbits/sec, PE 24C forwards traffic to PP 24E at a rate of 10 Gbits/sec, and PP 24D forwards traffic to PP 24E at a rate of 15 Gbits/sec. Assume also that destination PP 24E has a bandwidth of 100 Gbits/sec. In this example, PP 24E receives a total traffic flow rate of 125 Gbits/sec from PPs 24A-24D, which exceeds the 100 Gbits/sec bandwidth of PP 24E. Without the techniques described in this disclosure, PP 24E would drop 25 Gbits of traffic despite the availability of PPs 24F-24H to carry the traffic. This is because source packet processors are typically only aware of their own "local" traffic flow rate, but are unaware of other "non-local" traffic flow rates of other source packet processors. This may result in inefficient utilization of destination packet processor bandwidth.

In accordance with the techniques described herein, source PPs 24A-24D are configured to exchange notifications, e.g., feedback messages, to provide traffic flow rate information, and use this information to update the load-balancing distribution of destination packet processors within their forwarding plane data structures. The techniques may allow for more efficient utilization of destination packet processor bandwidth, and may avoid an oversubscribed destination packet processor dropping traffic. For ease of illustration, the following examples are described with respect to PP 24A, but may be implemented by any source packet processor of vPE 22.

In the example of FIG. 1, PPs 24A-24H may include feedback components 44A-44H, respectively, to determine local and non-local traffic flow rates. For example, each of source PPs 24A-24D may execute a timer thread to determine the number of instances in which a destination packet processor, e.g., PP 24E, is selected in a local forwarding plane data structure ((referred to herein as "Local Count" or "$C_{local}$"). For example, feedback component 44A of PP 24A may determine the number of instances in which PP 24E is selected from local forwarding plane data structure 42A and store the number of instances in a Local Count field of forwarding plane data structure 42A, feedback component 44B of PP 24B may determine the number of instances in which PP 24E is selected from local forwarding plane data structure 42B and store the number of instances in a Local Count field of forwarding plane data structure 42B, feedback component 44C of PP 24C may determine the number of instances in which PP 24E is selected from local forwarding plane data structure 42C and store the number of instances in a Local Count field of forwarding plane data structure 42C, and feedback component 44D of PP 24D may determine the number of instances in which PP 24E is selected from local forwarding plane data structure 42D and store the number of instances in a Local Count field of forwarding plane data structure 42D. Assume for example that PP 24A stores a value of 90 Gbits/sec in a Local Count field of forwarding plane data structure 42A, PP 24B stores a value of 10 Gbits/sec in a Local Count field of forwarding plane data structure 42B, PP 24C stores a value of 10 Gbits/sec in a Local Count field of forwarding plane data structure 42C, and PP 24D stores a value of 15 Gbits/sec in a Local Count field of forwarding plane data structure 42D.

Source PPs 24A-24D may exchange traffic feedback information. For example, source PPs 24A-24D may exchange local traffic flow rate information, via feedback components 44A-44D, respectively. For example, feedback component 44A may generate feedback messages including, for example, an aggregated fabric index that identifies AF 32 and the Local Count of PP 24A (e.g., 90 Gbits/sec), and sends the feedback messages to PPs 24B-24D, respectively. PP 24A may also receive respective feedback messages from PPs 24B-24D, wherein each feedback message includes the aggregated fabric index that identifies AF 32 and a respective Local Count. For example, PP 24A may receive from PP 24B a feedback message having the aggregated fabric index identifying AF 32 and the Local Count of PP 24B (e.g., 10 Gbits/sec), a feedback message from PP 24C having the aggregated fabric index identifying AF 32 and the Local Count of PP 24C (e.g., 10 Gbits/sec), and a feedback message from PP 24D having the aggregated fabric index identifying AF 32 and the Local Count of PP 24D (e.g., 15 Gbits/sec). In some examples, the feedback messages may include interrupt messages generated from microcode.

PP 24A may receive the respective feedback messages (otherwise referred to herein as "notifications" or "notification messages") from PPs 24B-24D and store the respective Local Counts of PPs 24B-24D (referred to herein as "Non-Local Count" or "$C_{non-local}$") in one or more Non-Local Count fields of forwarding plane data structure 42A. The Non-Local Count may represent the number of instances in which a destination packet processor, e.g., PP 24E, is selected by other source packet processors. For example, PP 24A may receive a feedback message from PP 24B including the aggregated fabric index identifying AF 32 and the Local Count of PP 24B (e.g., 10 Gbits/sec), and add the Local Count of PP 24B to a Non-Local Count field in forwarding plane data structure 42A. PP 24A may also receive a feedback message from PP 24C including the aggregated fabric index identifying AF 32 and the Local Count of PP 24C (e.g., 10 Gbits/sec), and add the Local Count of PP 24C to the Non-Local Count field in forwarding plane data structure 42A. PP 24A may further receive a feedback message from PP 24D including the aggregated fabric index identifying AF 32 and the Local Count of PP 24D (e.g., 15 Gbits/sec), and add the Local Count of PP 24D to the Non-Local Count field in forwarding plane data structure 42A. Based on the above feedback messages, forwarding plane data structure 42A may include a Non-Local Count field with a value of 35 Gbits/sec that represents the traffic flow rate from source PPs 24B-24D to destination PP 24E.

In some examples, PP 24A may compute a sum of the Local Count field and the Non-Local Count field of forwarding plane table 42A (referred to herein as "total traffic flow rate"), and determine whether the total traffic flow rate exceeds the bandwidth of the destination packet processor, as shown below:

Sum $(C_{local}, C_{non-local})$>Bandwidth of destination PP

For example, if the total traffic flow rate exceeds the bandwidth of destination PP 24E, vPE 22 may update forwarding plane data structure 42A of PP 24A to reduce the likelihood of selecting destination PP 24E within forwarding plane data structure 42A to forward packet flows. Continuing the example above, source PP 24A may compute a total traffic flow rate of 125 Gbit/sec, which exceeds the 100 Gbit/sec bandwidth of destination PP 24E. As one example, vPE 22 may dynamically adjust the weight of destination PP 24E within forwarding plane table 42A to reduce the oversubscription of destination PP 24E. In some examples, vPE 22 may compute a dynamic weight of destination PP 24E that is used to adjust the number of entries of destination PP 24E within forwarding plane data structure 42A.

In some examples, vPE 22 may determine a dynamic weight of a destination packet processor as follows:

$$\text{Dynamic Weight} = 1 - \left(\frac{\text{Excess Bandwidth}}{\text{Bandwidth of Destination } PP}\right)$$

The dynamic weight of PP 24E is computed from the default weight of PP 24E (e.g., 1), the amount of excess bandwidth (i.e., 25 Gbits/sec), and the bandwidth of destination PP 24E (i.e., 100 Gbits/sec). In this example, the dynamic weight of PP 24E in forwarding plane data structure 42A is reduced by 25% (i.e., a dynamic weight of 75%).

vPE 22 may update forwarding plane data structure 42A in accordance with the dynamic weight, as shown below.

Number of Entries=FN(Dynamic Weight*Bandwidth of Destination PP)

For example, vPE 22 may reduce the number of entries of destination PP 24E within forwarding plane data structure 42A based on the dynamic weight and bandwidth of destination PP 24E. For example, assume that forwarding plane data structure 42A includes 64 entries and each of PPs 24E-24H has the same bandwidth (e.g., 100 Gbits/sec). In this example, forwarding plane data structure 42A is initially configured with an even distribution of 16 entries for each of destination PPs 24E-24H. In response to determining that the total traffic flow rate exceeds the bandwidth of destination PP 24E, vPE 22 may compute a dynamic weight of destination PP 24E (e.g., 0.75), reduce the bandwidth of PP 24E according to the dynamic weight, and update forwarding plane data structure 42A by reducing the number of entries of PP 24E from 16 to 13, and increasing the number of entries of each of PPs 24F-24H from 16 to 17. By reducing the number of entries of PP 24E in forwarding plane data structure 42A, PP 24A is more likely to select another one of destination PPs 24F-24G to forward the packet (e.g., as illustrated by the heavier weighted lines in FIG. 1) than PP 24E from forwarding plane data structure 42A. That is, the likelihood of source PP 24A selecting destination PP 24E in forwarding plane data structure 42A decreases, thereby reducing the likelihood of oversubscription of destination PP 24E.

In some examples, the dynamic weight is configured within the range of at least 0.2 to less than 1. Assume for example the excess bandwidth towards destination PP 24E is 100 Gbit/sec. In this example, the computed dynamic weight for PP 24E is 0. To avoid excluding all entries of PP 24E from forwarding plane data structure 42A, vPE 22 may configure a dynamic weight for PP 24E of at least 0.2 and less than 1.

In some examples, vPE 22 may revert the weight of each of destination packet processors 24E-24H back to the default weight (i.e., 1). For example, a restore-timer may be used for periodically evaluating the total traffic flow rate on AF 32. When the time period of the restore-timer elapses, vPE 22 may evaluate the total traffic flow rates. If the traffic flow rate is below a threshold traffic flow rate, vPE 22 may increase the weight, such as by resetting all of the weights to 1 (e.g., the default weight). In one example, if the total traffic flow rate from vPE 22 is below a threshold bandwidth (e.g., 20%) of the total bandwidth for PPs 24E-24H, the dynamic weight of each of destination PPs 24E-24H in forwarding plane data structure 42A is restored to 1 and forwarding plane data structure 42A is updated to evenly distribute the number of entries of PPs 24E-24H. In this manner, vPE 22 may employ dynamic weight allocation to manage the load-balancing weights.

Figure 2:
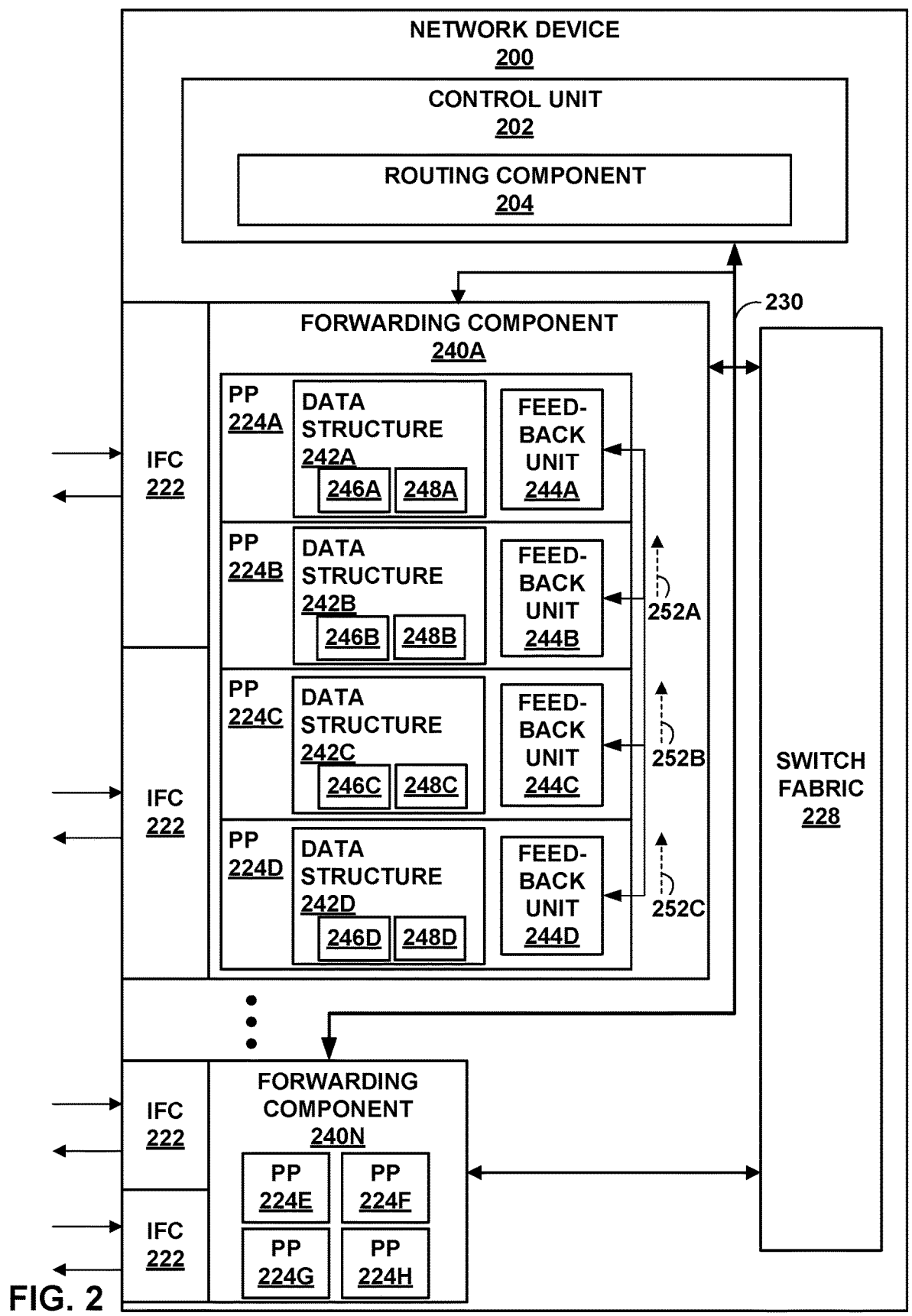
FIG. 2 is a block diagram illustrating an example network device, in accordance with the techniques described in this disclosure.

FIG. 2 is a block diagram illustrating an example network device 200 that provides adaptive load-balancing, in accordance with the techniques described in this disclosure. Network device 200 may represent network device 20 of FIG. 1, for example. Network device 200 may include multiple virtual network nodes illustrated as forwarding components 240A-240N (collectively, "forwarding components 240") operating as, for example, virtual provider edge or virtual customer edge routers, virtual autonomous system border routers (ASBRs), virtual area border routers (ABRs), or another type of network device, such as a virtual switch.

In this example, network device 200 includes a control unit 202 that provides control plane functionality for network device 200. Control unit 202 may be distributed among multiple entities, such as one or more routing components and one or more service cards insertable into network device 200. In such instances, network device 200 may therefore have multiple control planes. In some examples, each virtual network node of network device 200 may have its own virtual control plane, e.g., vCPs 26 of FIG. 1.

Control unit 202 may include a routing component 204 that provides control plane functions, storing network topology in the form of routing tables, executing routing protocols to communicate with peer routing devices, and maintaining and updating the routing tables. Routing component 204 also provides an interface to allow user access and configuration of network device 200.

Network device 200 also includes a plurality of forwarding components, e.g., forwarding components 240, and a switch fabric 228, that together provide a forwarding plane for forwarding and otherwise processing subscriber traffic. Forwarding components 240 may be, for example, any of vPE 22 and vP 28 of FIG. 1.

Control unit 202 is connected to each of forwarding components 240 by internal communication link 230. Internal communication link 230 may comprise a 100 Mbps or 1 Gbps Ethernet connection, for instance. Routing component 204 may execute daemons (not shown), e.g., user-level processes that may run network management software, to execute routing protocols to communicate with peer routing devices, execute configuration commands received from an administrator, maintain and update one or more routing tables, manage subscriber flow processing, and/or create one or more forwarding tables (e.g., forwarding plane data structures 242) for installation to forwarding components 240, among other functions.

Control unit 202 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 202 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Forwarding components 240 receive and send data packets via interfaces of interface cards 222A-222N ("IFCs 222") each associated with a respective one of forwarding components 240. Each of forwarding components 240 and its associated ones of IFCs 222 may reside on a separate line card (not shown) for network device 200. Example line cards include flexible programmable integrated circuit (PIC) concentrators (FPCs), dense port concentrators (DPCs), and modular port concentrators (MPCs). Each of IFCs 222 may include interfaces for various combinations of layer two (L2) technologies, including Ethernet, Gigabit Ethernet (GigE), and Synchronous Optical Networking (SONET) interfaces. In various aspects, each of forwarding components 240 may comprise more or fewer IFCs. Switch fabric 228 provides a high-speed interconnect for forwarding incoming data packets to the selected one of forwarding components 240 for output over a network. Switch fabric 228 may include multiple fabric links (not shown).

In some examples, switch fabric 228 may be a distributed, multi-stage switch fabric architecture, in which network packets traverse multiple stages of the switch fabric located in distributed forwarding components of the router to travel from an ingress point of the switch fabric to an egress point of the switch fabric. As one example, switch fabric 228 may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may viewed as an independent portion of the multi-stage Clos switch fabric, where each plane provides switching redundancy.

Forwarding components 240 process packets by performing a series of operations on each packet over respective internal packet processing paths as the packets traverse the internal architecture of network device 200. Operations may be performed, for example, on each packet by any of a corresponding ingress interface, an ingress forwarding component (e.g., forwarding component 240A), an egress forwarding component (e.g., forwarding component 240N), an egress interface or other components of network device 200 to which the packet is directed prior, such as one or more service cards. The result of packet processing determines the way a packet is forwarded or otherwise processed by forwarding components 240 from its input interface on one of IFCs 222 to its output interface on one of IFCs 222.

To illustrate by way of an example, assume forwarding components 240A and 240N may include PPs 224A-224D, and 224E-224H, respectively. PPs 224A-224H may be PPs 24A-24H of FIG. 1. In the example of FIG. 2, forwarding component 240A may represent a source forwarding component and forwarding component 240N may represent a destination forwarding component. Assume also that forwarding component 240N is the egress forwarding component to transmit data to the IP/MPLS core network. Forwarding component 240A may initially forward the incoming traffic to forwarding component 240N, which in turn forwards the packet to the IP/MPLS core network.

To provide adaptive load-balancing, PP 224A may update forwarding plane data structure 242A based on traffic feedback from PPs 224B-224D. For example, PPs 224A-224D includes feedback components 244A-244D (collectively, "feedback components 244"), respectively, for determining local and non-local traffic flow rates from source packet processors to a destination packet processor. In the example of FIG. 2, PP 224A includes feedback component 244A for determining a local traffic flow rate (e.g., referred to herein as "Local Count") of PP 224A, and stores the Local Count of PP 224A in Local Count entry 246A of forwarding plane data structure 242A (e.g., increment a counter in forwarding plane data structure). PP 224B includes feedback component 244B for determining a Local Count of PP 224B, and stores the Local Count of PP 224B in Local Count entry 246B of forwarding plane data structure 242B. PP 224C includes feedback component 244C for determining a Local Count of PP 224C, and stores the Local Count of PP 224C in Local Count entry 246C of forwarding plane data structure 242C. PP 224D includes feedback component 244D for determining a Local Count of PP 224D, and stores the Local Count of PP 224D in Local Count entry 246D of forwarding plane data structure 242D.

Feedback component 244A may receive feedback messages 252A-252C (collectively, "feedback messages 252"), each comprising an aggregated fabric index and a respective Local Count. For example, feedback component 244A may receive feedback message 252A from feedback component 244B comprising an aggregated fabric index identifying the aggregated fabric, and the Local Count of PP 224B. Feedback component 244A adds the Local Count of PP 224B to Non-Local Count field 248A in forwarding plane data structure 242A. Feedback component 244A may also receive feedback message 252B from feedback component 244C comprising an aggregated fabric index identifying the aggregated fabric, and the Local Count of PP 224C. Feedback component 224A adds the Local Count of PP 224C to Non-Local Count field 248A in forwarding plane data structure 242A. Feedback component 244A may further receive feedback message 252C from feedback component 244D comprising an aggregated fabric index identifying the aggregated fabric, and the Local Count of PP 224D. Feedback component 244A adds the Local Count of PP 224D to Non-Local Count field 248A in forwarding plane data structure 242A.

PP 224A may compute the total traffic flow rate, i.e., the sum of Local Count field 246A and Non-Local Count field 248A in forwarding plane data structure 242A. PP 224A may compare the total traffic flow rate with the bandwidth of PP 224E of forwarding component 240N. If the total traffic flow rate exceeds the bandwidth of PP 224E, forwarding component 240A may update forwarding plane data structure 242A to reduce the likelihood of selecting PP 224E within forwarding plane data structure 242A. For example, feedback unit 244A may send a request message to a microkernel of forwarding component 240A (as further described with respect to FIG. 3) such that the microkernel may compute a dynamic weight of PP 224E that is used to update forwarding plane data structure 242A.

Figure 3:
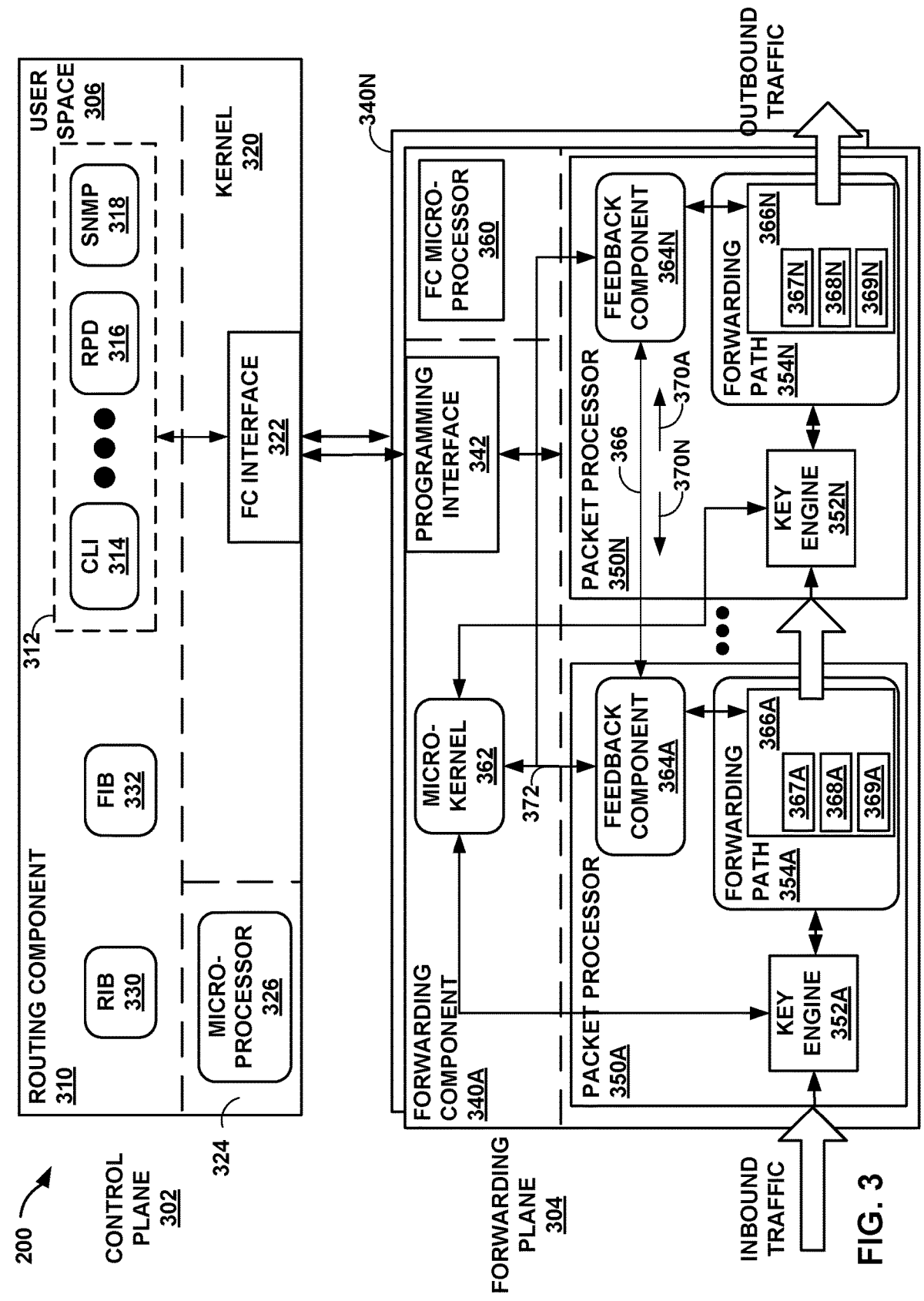
FIG. 3 is a block diagram illustrating components of the network device in further detail, in accordance with techniques described in this disclosure.

FIG. 3 is a block diagram illustrating components of network device 200 of FIG. 2 in further detail. Any of forwarding components 340A-340N (collectively, "forwarding components 340") may be an ingress forwarding component with respect to one packet flow and an egress forwarding component with respect to another packet flow. Although forwarding components 340 are illustrated as including the modules for both an ingress forwarding component and an egress forwarding component, forwarding components 340 may include more or less modules as shown in FIG. 3. As described below, forwarding component 340A may represent vPE 22 of FIG. 1.

In this example, routing component 310 provides a control plane 302 operating environment for execution of various user-level daemons 312 executing in user space 306. Daemons 312 are user-level processes that may run network management software, execute routing protocols to communicate with peer routing devices, execute configuration commands received from an administrator, maintain and update one or more routing tables, manage subscriber flow processing, and/or create one or more forwarding tables for installation to forwarding components 340, among other functions. In this example, daemons 312 include command-line interface daemon 314 ("CLI 314"), routing protocol daemon 316 ("RPD 316"), and Simple Network Management Protocol daemon 318 ("SNMP 318"). In this respect, control plane 302 may provide routing plane, service plane, and management plane functionality for the network device. Various instances of routing component 310 may include additional daemons 312 not shown in FIG. 3 that perform other control, management, or service plane functionality and/or drive and otherwise manage forwarding plane functionality for the network device.

Daemons 312 operate over and interact with kernel 320, which provides a run-time operating environment for user-level processes. Kernel 320 may comprise, for example, a UNIX operating system derivative such as Linux or Berkeley Software Distribution (BSD). Kernel 320 offers libraries and drivers by which daemons 312 may interact with the underlying system. Forwarding component interface 322 ("FC interface 322") of kernel 320 comprises a kernel-level library by which daemons 312 and other user-level processes or user-level libraries may interact with programming interface 342 of forwarding component 340A. FC interface 322 may include, for example, a sockets library for communicating with forwarding component 340A over dedicated network links.

Hardware environment 324 of routing component 310 comprises microprocessor 326 that executes program instructions loaded into a main memory (not shown in FIG. 3) from storage (also not shown in FIG. 3) in order to execute the software stack, including both kernel 320 and user space 306, of routing component 310. Microprocessor 326 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 316 executes one or more interior and/or exterior routing protocols to exchange routing information with other network devices and store received routing information in routing information base 330 ("RIB 330"). For example, RPD 316 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). RPD 316 may additionally, or alternatively, execute User Datagram Protocol (UDP) to send and receive data for various system resources, such as physical interfaces. Although described with respect to UDP, RPD 316 may execute any protocol to exchange data for system resources.

RIB 330 may include information defining a topology of a network, including one or more routing tables and/or link-state databases. RPD 316 resolves the topology defined by routing information in RIB 330 to select or determine one or more active routes through the network and then installs these routes to forwarding information base 332. Typically, RPD 316 generates FIB 332 in the form of a radix or other lookup tree to map packet information (e.g., header information having destination information and/or a label stack) to next hops and ultimately to interface ports of interface cards associated with respective forwarding components 340. Kernel 320 may synchronize FIB 332 of routing component 310 with forwarding information of forwarding component 340A.

Command line interface daemon 314 ("CLI 314") provides a shell by which an administrator or other management entity may modify the configuration of the network device using text-based commands. SNMP 318 comprises an SNMP agent that receives SNMP commands from a management entity to set and retrieve configuration and management information for network device 200. Using CLI 314 and SNMP 318, for example, management entities may enable/disable and configure services, manage classifications and class of service for packet flows, install routes, enable/disable and configure rate limiters, configure traffic bearers for mobile networks, and configure interfaces, for example. CLI 314, RPD 316, and SNMP 318 in this example configure forwarding plane 304 via FC interface 322 to implement configured services, and/or add/modify/delete routes. FC interface 322 allows daemons 312 to drive the installation and configuration of forwarding component 340A. In particular, FC interface 322 includes an application programming interface (API) by which daemons 312 may map packet flows to fabric interfaces for forwarding.

Forwarding components 340A-340N (collectively, "forwarding components 340") of network device 200, each implements forwarding plane 304 (also known as a "data plane") functionality to handle packet processing from ingress interfaces on which packets are received to egress interfaces to which packets are sent. Forwarding plane 304 determines data packet forwarding through network device 200, applies services, rate limits packet flows, filters packets, and otherwise processes the packets using service objects and lookup data installed by control plane 302 to forwarding plane 304. Although FIG. 3 illustrates only forwarding components 340A in detail, each of forwarding components 340 of network device 200 comprises similar modules that perform substantially similar functionality.

Forwarding components 340 may each include one or more packet processors. For example, forwarding component 340A may include packet processors 350A-350N (collectively, "packet processors 350" or "PPs 350"). Packet processors 350 may include, e.g., Application-specific integrated circuit based packet processors ("ASICs") or any packet forwarding engine that performs adaptive load-balancing in accordance with techniques described herein. Packet processors 350A-350N include one or more programmable application-specific integrated circuits having key engines 352A-352N (collectively, "key engines 352"), respectively, that execute microcode (or "microinstructions") to control and apply fixed hardware components of packet processors 350 to process packet "keys." A packet key includes packet fields and other parameters that determine a flow of packet.

Internal forwarding paths 354A-354N (collectively, "forwarding paths 354") of packet processors 350A-350N, respectively, each comprises programmable, executable microcode and fixed hardware components that determine the packet processing actions and other operations performed by a key engine 352. Forwarding component 340A may store executable instructions of forwarding paths 354 in computer-readable storage media, such as static random access memory (SRAM). While illustrated within packet processor 350, in some examples executable instructions of forwarding paths 354 may be stored in memory external to packet processors 350 in forwarding component 340A.

In some aspects, forwarding paths 354 each includes a next hop data structure to initiate processing. At the end of each processing step by key engines 352, the result is a next hop that may specify additional processing or the termination of processing, for instance. In addition, next hops may specify one or more functions to be executed by key engines 352 and/or one or more hardware elements to be applied (e.g., policers).

As further described below, forwarding paths 354 may include forwarding plane data structures 366A-366N (collectively, "forwarding plane data structures 366"), respectively. Each of forwarding plane data structures 366 may comprise tables or other data structures that includes a respective one of Local Count fields 367A-367N (collectively, "Local Count field 367"), Non-Local Count fields 368A-368N (collectively, "Non-Local Count field 368"), and load-balanced distributions of destination packet processors 369A-369N (collectively, "distribution 369") used to forward traffic.

Forwarding component microprocessor 360 ("FC microprocessor 360") manages packet processors 350 and executes programming interface 342 to provide an interface for/to routing component 310. Programming interface 342 may comprise one or more user- or kernel-level libraries, programs, toolkits, application programming interfaces (APIs) and may communicate control and data messages to forwarding components 340 via internal communication link (e.g., communication link 230 in FIG. 2) using sockets, for example. FC microprocessor 360 may execute a microkernel 362 to provide an operating environment for interfaces. Programming interface 342 receives messages from routing component 310 directing packet forwarding component 340A to configure forwarding paths 354.

In accordance with the techniques of this disclosure, packet processors 350A-350N may include a feedback components 364A-364N (collectively, feedback components 364"), respectively, to determine traffic flow rates from source packet processors 350 of ingress forwarding component 340A to a destination packet processor of egress forwarding component 340N.

For example, feedback component 364A of packet processor 350A may determine and exchange traffic flow rate information with feedback component 364N of packet processor 350N. Feedback component 364A may determine the number of instances in which a destination packet processor is selected from local forwarding plane data structure 366A, and store the value in Local Count field 367A of forwarding plane data structure 366A. Feedback component 364N of PP 350A may determine the number of instances in which the same destination packet processor is selected from local forwarding plane data structure 366N, and store the value in Local Count field 367N of forwarding plane data structure 367N.

Feedback components 364 may exchange feedback messages 370A-370N (collectively, "feedback messages 370") including traffic flow rate information via fabric links 366. Feedback components 364 may exchange feedback messages 370 such that packet processors 350 of forwarding component 340A may determine the traffic flow rate from other source packet processors to a destination packet processor of forwarding component 340N. For example, feedback component 364A may generate a feedback message 370A including an aggregated fabric index and the value from Local Count field 367A, and send feedback message 370A to feedback component 364N of packet processor 350N. Feedback component 364A may also receive one or more feedback messages 370N from feedback component 364N of source packet processor 350N, wherein the feedback message 370N includes the aggregated fabric index and the value from Local Count field 367N. In some examples, feedback messages 370 may be interrupt messages generated using microcode.

In response to receiving feedback message 370N from feedback component 364N, feedback component 364A identifies the aggregated fabric index, performs a lookup of forwarding plane data structure 366A for the identified aggregated fabric, and adds the value from Local Count field 367N included in feedback message 370N to Non-Local Count field 368A in forwarding plane data structure 366A.

In some examples, feedback component 364A may compute a total traffic flow rate from the Local Count field 367A and the Non-Local Count field 368A of forwarding plane data structure 366A, and determine whether the total traffic flow rate exceeds the bandwidth of the destination packet processor. If the total traffic flow rate exceeds the bandwidth of the destination packet processor, feedback component 364A may generate a request message 372 to request microkernel 362 to update/reprogram forwarding plane data structure 366A. In some examples, feedback component 364A may generate request message 372 using microcode. Request message 372 may include an identifier of the oversubscribed (or would be oversubscribed) destination packet processor, the total traffic flow rate (e.g., the sum of Local Count field 367A and Non-Local Count field 368A), and the values of Local Count field 367A and Non-Local Count field 368A of forwarding plane data structure 366A.

Feedback component 364A may send request message 372 to microkernel 362. Although FIG. 4 is described with respect to feedback component 364A sending request message 372, other feedback components 364 of packet processors 350 may also send request messages to microkernel 362. In response to receiving a request message 372, microkernel 362 may dynamically adjust the load-balanced distribution 369A of the destination packet processors within forwarding plane data structure 366A. In some examples, microkernel 362 may be configured to only update the forwarding plane data structures if a certain threshold number of packet processors 350A-350N (e.g., more than 50%) send a request message 372 indicating that a particular destination packet processor is oversubscribed. Conversely, if less than the threshold number of packet processors 350 report that the destination packet processor is oversubscribed, microkernel 362 will not make changes to the forwarding plane data structures for that destination packet processor. This aspect may require some agreement among the packet processors and thereby avoid changing weights based on spurious notification(s) and causing churn in the forwarding state. In any event, in some examples, microkernel 362 may, based on a Local Count field included in request message 372, determine the source packet processor that forwards the most traffic to a destination packet processor and may dynamically adjust the load-balanced distribution within the forwarding plane data structure of the source packet processor that forwards the most traffic.

Microkernel 362 may use information included in request message 372 to calculate a dynamic weight (as described with respect to FIG. 1) of the destination packet processor. Microkernel 362 may reduce the likelihood that packet processor 350A may select the destination packet processor in forwarding plane data structure 366A to forward packet flows. For example, microkernel 362 may compute a dynamic weight of the destination packet processor that is used to reduce the bandwidth of the destination packet processor. Microkernel 362 may update the load-balanced distribution 369A of destination packet processors based on the reduced bandwidth of the destination packet processor. In some examples, microkernel 362 may include a restore-timer (not shown) for periodically evaluating the total traffic flow rate on the aggregated fabric (e.g., AF 32 of FIG. 1). For example, microkernel 362 may determine the traffic flow rate from each of its packet processors, e.g., packet processors 350A-350N. If the total traffic flow rate on the aggregated fabric is below 20% of the bandwidth of the destination packet processor, the dynamic weight of each of destination packet processors in forwarding component 340N is restored to 1 and forwarding component 340A is updated to evenly distribute the number of entries of PPs 350A-350N.

FIG. 4 is an example illustration of an updated forwarding plane data structure, in accordance with the techniques described herein. Forwarding plane data structures 400 and 400' of FIG. 4 may represent any of forwarding plane data structures 42 of FIG. 1, forwarding plane data structures 242 of FIG. 2, and/or hash lookup data structures 366 of FIG. 3. Forwarding plane data structures 400 and 400' will be described with respect to forwarding plane data structure 42A of source packet processor 24A in FIG. 1. In the example of FIG. 4, forwarding plane data structure 400 may represent an initial forwarding plane data structure and forwarding plane data structure 400' may represent an updated forwarding plane data structure.

Forwarding plane structure 400 includes an aggregated fabric index 402 ("AF INDEX 402"), a Local Count field 404, a Non-Local Count field 406, and a load-balanced distribution of destination packet processors PP 24E-24H ("DISTRIBUTION 408").

In this example, aggregated fabric index 402 identifies an aggregated fabric (e.g., AF 32 of FIG. 1). Local Count field 404 may include a local traffic flow rate determined by PP 24A. For example, the local traffic flow rate may represent the number of instances in which a destination packet processor, e.g., PP 24E, is selected from forwarding plane data structure 42A by packet processor 24A. Non-Local Count field 404 may include non-local traffic flow rates of PPs 24B-24D. For example, the non-local traffic flow rates may represent the number of instances in which the PP 24E is selected from respective forwarding plane data structures by other packet processors, e.g., PPs 24B-24D.

In the example of FIG. 4, distribution 408 may include 64 entries representing a load-balanced distribution of destination packet processors PP 24E-24H. Assume for example that PPs 24E-24H each have the same bandwidth (e.g., 100 Gbits/sec). In this example, forwarding plane data structure 400 may represent an initial forwarding plane data structure with an even distribution of entries for each of PPs 24E-24H. For example, distribution 408 may include 16 entries for PP 24E (illustrated by the shaded entries), 16 entries for PP 24F, 16 entries for PP 24G, and 16 entries for PP 24H. In response to determining that the total traffic flow rate exceeds the bandwidth of a destination packet processor, a microkernel of a forwarding component may compute a dynamic weight of an oversubscribed (or would be oversubscribed) destination packet processor, e.g., PP 24E. The microkernel may use the dynamic weight of PP 24E (e.g., 0.75) to reduce the bandwidth of PP 24E and update (e.g., reprogram) forwarding plane data structure 400 (represented by forwarding plane data structure 400') based on the reduced bandwidth of PP 24E. In this example, distribution 408' of forwarding plane data structure 400' is updated to include 13 entries for PP 24E (illustrated by the shaded entries), whereas PPs 24F-24H each include 17 entries. In this way, the updated forwarding plane data structure 400' includes fewer entries of PP 24E such that the likelihood of selecting PP 24E is reduced.

Figure 5:
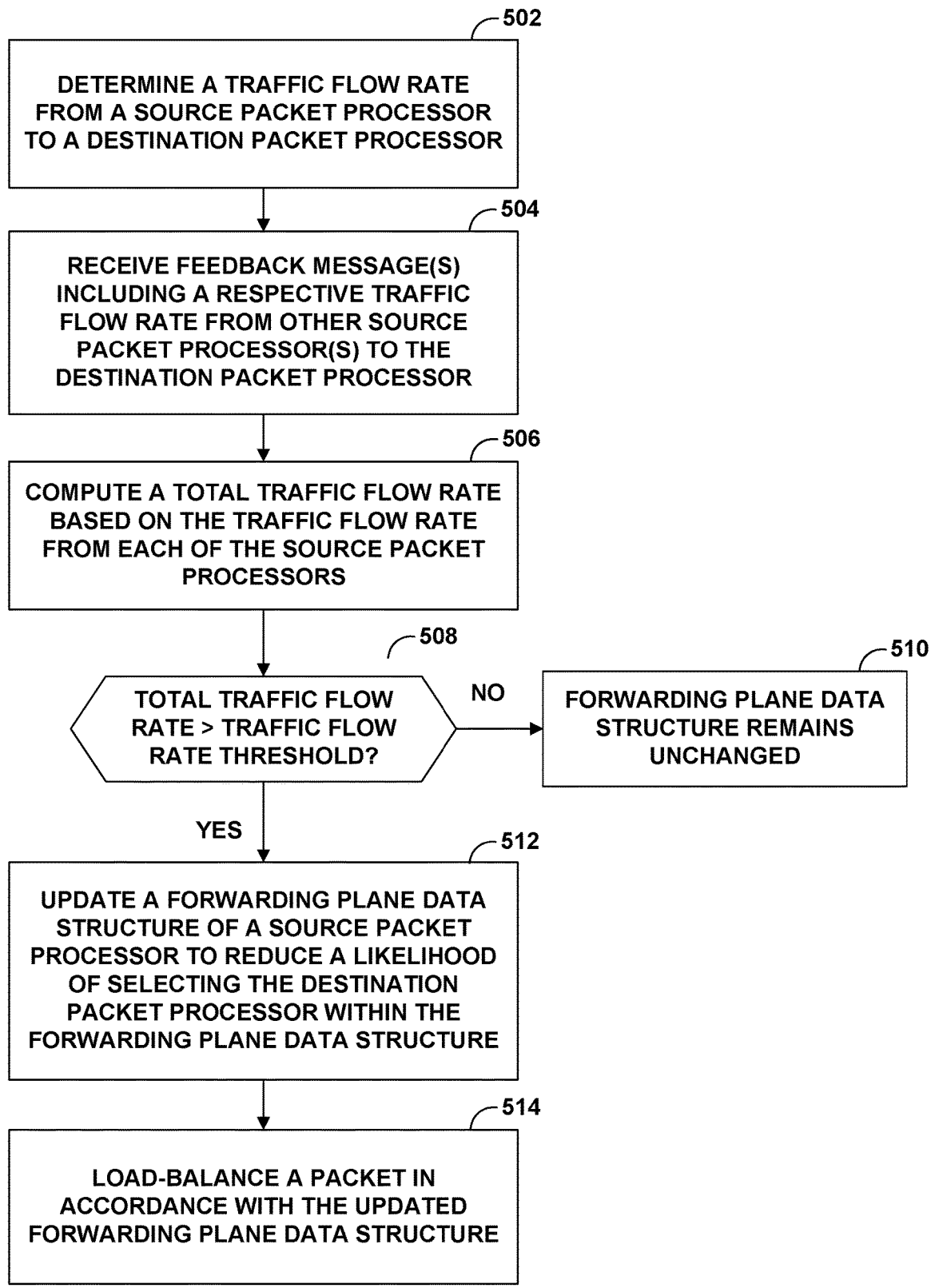
FIG. 5 is a flowchart illustrating example operation of a network device, in accordance with techniques described in this disclosure.

FIG. 5 is a flowchart illustrating an example operation of a network device, in accordance with techniques described in this disclosure. FIG. 5 will be described for purposes of example with respect to FIGS. 1-3.

In the example of FIG. 5, a source virtual network node, e.g., vPE 22 of network device 20 may determine a destination packet processor of the plurality of destination PPs 24E-24H may become oversubscribed. For example, source PP 24A may determine a traffic flow rate from PP 24A to a destination packet processor, e.g., PP 24E (502). In some examples, PP 24A may determine a number of instances in which PP 24E is selected from local forwarding plane data structure 42A of source PP 24A. PP 24A may store the number of instances in a Local Count field of forwarding plane data structure 42A.

PP 24A may receive one or more feedback messages specifying respective traffic flow rates from other source packet processors e.g., PPs 24B-24D, to the destination PP 24E (504). For example, PP 24A may receive respective feedback messages from PPs 24B-24D, each of the feedback messages including an aggregated fabric index identifying AF 32 and a respective traffic flow rate of PPs 24B-24D. PP 24A may store the respective traffic flow rate of PPs 24B-24D in a Non-Local Count field of forwarding plane data structure 42A.

PP 24A may compute a total traffic flow rate based on the traffic flow rate from each of the source packet processors (506). For example, PP 24A may compute the sum of the Local Count field and the Non-Local Count field in forwarding plane data structure 42A.

PP 24A may compare the total traffic flow rate with the bandwidth of PP 24E (508). For example, if the total traffic flow rate of source PPs 24A-24D does not exceed a traffic flow rate threshold for PP 24E ("NO" branch of step 508), the forwarding plane data structure 42A remains unchanged (510).

If the total traffic flow rate of source PPs 24A-24D exceeds the traffic flow rate threshold for PP 24E ("YES" branch of step 508), forwarding plane data structure 42A is updated to reduce the likelihood of selecting PP 24E within forwarding plane data structure 42A (512). For example, PP 24A may generate a request message to a microkernel of a forwarding component. In response to receiving the request message, the microkernel may compute a dynamic weight of destination PP 24E based on an amount of excess bandwidth and the bandwidth of the particular destination packet processor. In the example described with respect to FIG. 1, the excess bandwidth may be 25 Gbits/sec and the bandwidth of PP 24E may be 100 Gbits/sec. As such, microkernel may compute a dynamic weight of 0.75 for destination PP 24E. The microkernel may adjust the bandwidth of PP 24E according to the dynamic weight of 0.75. As a result, the adjusted bandwidth of PP 24E (e.g., 75 Gbits/sec) is used to update forwarding plane data structure 42A.

In this way, forwarding plane data structure 42A is updated with fewer entries of PP 24E in forwarding plane data structure 42A, thereby reducing the likelihood to select PP 24E within forwarding plane data structure 42A. In some examples, the microkernel may compute a dynamic weight within the range of at least 0.2 and less than 1 to avoid excluding all entries of PP 24E from forwarding plane data structure 42A (e.g., when the excess bandwidth is the same value as the bandwidth of PP 24E). In some examples, vPE 22 may revert the weight of each of destination packet processors 24E back to the default weight (i.e., 1). For example, microkernel 362 may include a restore-timer for periodically evaluating the total traffic flow rate on the aggregated fabric, e.g., AF 32. If the total traffic flow rate on the aggregated fabric is below 20% of the bandwidth of PP 24E, the dynamic weight of each of destination PPs 24E-24H in forwarding plane data structure 42A is restored to 1 and forwarding plane data structure 42A is updated to evenly distribute the number of entries of PPs 24E-24H.

Source PP 24A load-balance packet flows in accordance with the updated forwarding plane data structure 42A (514). In this way, vPE 22 may dynamically adjust load-balancing of packet flows for PP 24A based on feedback messages including traffic flow rate information.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
   determining, by a source virtual network node of a network device including the source virtual network node having a plurality of source packet processors, a destination virtual network node having a plurality of destination packet processors, and a switch fabric comprising a plurality of fabric links coupling respective pairs of the plurality of source packet processors and the plurality of destination packet processors at respective fabric interfaces of the plurality of source packet processors and the plurality of destination packet processors, that a particular destination packet processor of the plurality of destination packet processors may become oversubscribed;
   in response to determining that the particular destination packet processor may become oversubscribed, updating, by the source virtual network node and based on a dynamic weight of the particular destination packet processor, a forwarding plane data structure of a source packet processor of the plurality of source packet processors according to an adjusted bandwidth of the particular destination packet processor adjusted based on the dynamic weight to reduce a likelihood of selecting the particular destination packet processor to which to forward packet flows, wherein updating the forwarding plane data structure of the source packet processor comprises reducing a number of entries of the forwarding plane data structure associated with the particular destination packet processor that may become oversubscribed; and
   load-balancing, by the source virtual network node, received packet flows in accordance with the updated forwarding plane data structure.

2. The method of claim 1, wherein the forwarding plane data structure comprises a hash lookup data structure including entries representing a load-balanced distribution of the plurality of destination packet processors for which to forward traffic.

3. The method of claim 1, wherein each of the plurality of fabric links is part of a single abstract fabric interface coupling the source virtual network node and the destination virtual network node of the network device.

4. The method of claim 1, further comprising:
   receiving, by a first source packet processor of the plurality of source packet processors, a plurality of feedback messages from other source packet processors of the plurality of source packet processors, wherein the feedback messages include respective traffic flow rate information from the other source packet processors to the particular destination packet processor,
   wherein determining the particular destination packet processor of the plurality of destination packet processors may become oversubscribed comprises determining based on the plurality of feedback messages.

5. The method of claim 4, wherein determining based on the plurality of feedback messages comprises:
   computing a total traffic flow rate based on the respective traffic flow rate information from the other source packet processors to the particular destination packet processor and a traffic flow rate information from the first source packet processor to the particular destination packet processor; and
   comparing the total traffic flow rate with a threshold traffic flow rate for the particular destination packet processor.

6. The method of claim 5, wherein the traffic flow rate information comprises a number of instances in which the particular destination packet processor is selected from a forwarding plane data structure of the source packet processor.

7. The method of claim 1, wherein updating the forwarding plane data structure with fewer entries of the particular destination packet processor comprises: determining the dynamic weight of the particular destination packet processor, wherein determining the dynamic weight is computed based on an amount of excess bandwidth and a bandwidth of the particular destination packet processor; adjusting the bandwidth of the particular destination packet processor according to the dynamic weight; and updating the forwarding plane data structure according to the adjusted bandwidth of the particular destination packet processor.

8. The method of claim 7, wherein determining the dynamic weight of the particular destination packet processor comprises determining the dynamic weight within a range of at least 0.2 and less than 1.

9. The method of claim 1, wherein updating the forwarding plane data structure to reduce the likelihood of selecting the particular destination packet processor within the forwarding plane data structure comprises updating the forwarding plane data structure of a source packet processor having a highest traffic flow rate to the particular destination packet processor.

10. A network device comprising:
    a source virtual network node having a plurality of source packet processors;

a destination virtual network node having a plurality of destination packet processors;

a plurality of fabric links coupling respective pairs of the plurality of source packet processors and the plurality of destination packet processors at respective fabric interfaces of the plurality of source packet processors and the plurality of destination packet processors, wherein the source virtual network node is configured to: determine that a particular destination packet processor of the plurality of destination packet processors may become oversubscribed;

in response to determining that the particular destination packet processor may become oversubscribed, update, based on a dynamic weight of the particular destination packet processor, a forwarding plane data structure of a source packet processor of the plurality of source packet processors according to an adjusted bandwidth of the particular destination packet processor adjusted based on the dynamic weight to reduce a likelihood of selecting the particular destination packet processor to which to forward packet flows, wherein updating the forwarding plane data structure of the source packet processor comprises reducing a number of entries of the forwarding plane data structure associated with the particular destination packet processor that may become oversubscribed; and load-balance received packet flows in accordance with the updated forwarding plane data structure.

11. The network device of claim 10, wherein the forwarding plane data structure comprises a hash lookup data structure including entries representing a load-balanced distribution of the plurality of destination packet processors for which to forward traffic.

12. The network device of claim 10, wherein each of the plurality of fabric links is part of a single abstract fabric interface coupling the source virtual network node and the destination virtual network node of the network device.

13. The network device of claim 10, wherein the source virtual network node is further configured to:

receive, by a first source packet processor of the plurality of source packet processors, a plurality of feedback messages from other source packet processors of the plurality of source packet processors, wherein the feedback messages include respective traffic flow rate information from the other source packet processors to the particular destination packet processor, wherein to determine the particular destination packet processor of the plurality of destination packet processors may become oversubscribed is based on the plurality of feedback messages.

14. The network device of claim 13, wherein, to determine the particular destination packet processor of the plurality of destination packet processors may become oversubscribed is based on the plurality of feedback messages, the source virtual network node is further configured to:

compute a total traffic flow rate based on the respective traffic flow rate information from of the other source packet processors to the particular destination packet processor and a traffic flow rate information from the first source packet processor; and compare the total traffic flow rate with a threshold traffic rate for the particular destination packet processor.

15. The network device of claim 14, wherein the traffic flow rate information comprises a number of instances in which the particular destination packet processor is selected from a forwarding plane data structure of the source packet processor.

16. The network device of claim 10, wherein, to update the forwarding plane data structure with fewer entries of the particular destination packet processor, the virtual network node is further configured to:

determine the dynamic weight of the particular destination packet processor, wherein to compute the dynamic weight is based on an amount of excess bandwidth and a bandwidth of the particular destination packet processor;

adjust the bandwidth of the particular destination packet processor according to the dynamic weight; and update the forwarding plane data structure according to the adjusted bandwidth of the particular destination packet processor.

17. The network device of claim 16, wherein, to determine the dynamic weight of the particular destination packet processor, the virtual network node is further configured to determine the dynamic weight within a range of at least 0.2 and less than 1.

18. A non-transitory computer-readable storage medium of a network device including a source virtual network node having a plurality of source packet processors, a destination virtual network node having a plurality of destination packet processors, and a switch fabric comprising a plurality of fabric links coupling respective pairs of the plurality of source packet processors and the plurality of destination packet processors at respective fabric interfaces of the plurality of source packet processors and the plurality of destination packet processors, the non-transitory computer-readable storage medium storing instructions that when executed cause one or more programmable processors of a network device to:

determine that a particular destination packet processor of a plurality of destination packet processors may become oversubscribed;

in response to determining that the particular destination packet processor may become oversubscribed, update, based on a dynamic weight of the particular destination packet processor, a forwarding plane data structure of a source packet processor of the plurality of source packet processors according to an adjusted bandwidth of the particular destination packet processor adjusted based on the dynamic weight to reduce a likelihood of selecting the particular destination packet processor to which to forward packet flows, wherein updating the forwarding plane data structure of the source packet processor comprises reducing a number of entries of the forwarding plane data structure associated with the particular destination packet processor that may become oversubscribed; and load-balance received packet flows in accordance with the updated forwarding plane data structure.

* * * * *